(12) United States Patent
Suriyanarayanan et al.

(10) Patent No.: US 12,034,807 B1
(45) Date of Patent: Jul. 9, 2024

(54) SYSTEM AND METHOD TO MANAGE DATA EXCHANGES IN A DECENTRALIZED NETWORK

(71) Applicant: Bank of America Corporation, Charlotte, NC (US)

(72) Inventors: Gowri Sundar Suriyanarayanan, Chennai (IN); Maneesh Kumar Sethia, Hyderabad (IN); Abhijit Behera, Hyderabad (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/477,652

(22) Filed: Sep. 29, 2023

(51) Int. Cl.
*H04L 67/1097* (2022.01)
*H04L 47/6275* (2022.01)

(52) U.S. Cl.
CPC ...... *H04L 67/1097* (2013.01); *H04L 47/6275* (2013.01)

(58) Field of Classification Search
CPC .................. H04L 67/1097; H04L 47/6275
See application file for complete search history.

(56) References Cited

U.S. PATENT DOCUMENTS

| | | | |
|---|---|---|---|
| 10,740,761 B2 | 8/2020 | Wu | |
| 11,018,850 B2 | 5/2021 | Carver et al. | |
| 11,042,873 B2 | 6/2021 | Konik et al. | |
| 11,082,230 B2 | 8/2021 | Xie | |
| 11,095,431 B2 | 8/2021 | Srivastava | |
| 11,095,679 B2 | 8/2021 | Guo et al. | |
| 11,127,000 B2 | 9/2021 | Pogorelik et al. | |
| 11,218,324 B2 | 1/2022 | Wentz et al. | |
| 11,290,324 B2 | 3/2022 | Smith et al. | |
| 11,356,263 B2 | 6/2022 | Fletcher et al. | |
| 11,507,948 B2 | 11/2022 | DeRosa-Grund | |
| 11,595,406 B2 | 2/2023 | Gluck et al. | |
| 11,599,528 B1 | 3/2023 | Holenstein et al. | |
| 11,734,675 B2 | 8/2023 | Fay et al. | |
| 2018/0004453 A1* | 1/2018 | Baptist | G06F 3/0659 |
| 2019/0266052 A1* | 8/2019 | Lamba | G06F 11/1092 |
| 2019/0354518 A1 | 11/2019 | Zochowski | |
| 2020/0125391 A1* | 4/2020 | Lee | G06Q 20/389 |
| 2020/0134581 A1 | 4/2020 | Hu et al. | |
| 2020/0250633 A1 | 8/2020 | Vinson et al. | |
| 2020/0327545 A1 | 10/2020 | Xie | |
| 2022/0100733 A1 | 3/2022 | Tock et al. | |
| 2022/0239470 A1 | 7/2022 | Zhang et al. | |

* cited by examiner

*Primary Examiner* — Chris Parry
*Assistant Examiner* — Steven C Nguyen

(57) ABSTRACT

An apparatus comprises a memory communicatively coupled to a processor. The memory may be configured to store data exchange requests. The processor may be configured to determine that a data exchange request of the data exchange requests comprises a status indicating that the data exchange request is incomplete, generate a priority value for the data exchange request indicating a batch priority associated with the data exchange request, and assign a weight for the data exchange request indicating that the data exchange request is expected to be completed in one or more batch orders. Further, the processor is configured to generate a batch order comprising a position in a queue corresponding to the batch priority and complete the data exchange request in the decentralized network in accordance with the position in the batch order.

20 Claims, 3 Drawing Sheets

Data Exchange Management Operations 200a

| Sender | Receiver | Requested Received | End State Complete |
|--------|----------|--------------------|--------------------|
| A | B | ✓ | ✓ |
| B | C | ✓ | ✗ |
| C | D | ✗ | ✗ |

*FIG. 2A*

Frozen Data Exchange Resolver Operations 200b

| Sender | Receiver | Priority |
|--------|----------|----------|
| B | C | High |
| C | D | Medium |
| M | N | Low |

*FIG. 2B*

Frozen Batch Processing Operations 200c

| Sender | Receiver | Priority | Weights | Current Batch |
|--------|----------|----------|---------|---------------|
| B | C | High | 15% | Yes |
| C | D | Medium | 5% | Yes |
| F | G | Medium | 6% | Next Batch |

*FIG. 2C*

SYSTEM AND METHOD TO MANAGE DATA EXCHANGES IN A DECENTRALIZED NETWORK

TECHNICAL FIELD

The present disclosure relates generally to operation of a system configured to exchange data in a decentralized network, and more specifically to a system and method to manage data exchanges in the decentralized network.

BACKGROUND

Interactions in decentralized networks may be lost in cases where an interaction link cannot be established between a sender and a receiver. Interactions are not completed if the interaction link is not established within a certain time period. In some cases, incomplete interactions cannot be recovered, which may cause the sender and/or the receiver to lose data.

SUMMARY OF THE DISCLOSURE

In one or more embodiments, a system and method disclosed herein dynamically manage data exchanges in a decentralized network. The system and method may be configured to monitor whether data exchanges are completed in the decentralized network. If a data exchange is not completed (e.g., considered as incomplete), the system and method are assigned a priority value and a weight that enables the incomplete data exchange to be completed by the decentralized network in current batching operations. The priority value may be representative of an urgency associated with completing the data exchange request within a predefined period of time. The weight may be representative of a period of time that the data exchange request has spent waiting to be complete.

In one or more embodiments, a system and method disclosed herein dynamically manage data exchanges in a decentralized network. The system and method may be configured to resolve incomplete data exchanges caused by problems, congestions, or lost caused by shutdowns in the decentralized networks. The system and method may comprise incoming interaction management operations configured to determine whether a user is planning to initiate a data exchange request. Upon detecting the incoming data exchange request, the incoming interaction manager may generate an entry defining a sender and a receiver for the data exchange request and initiate the data exchange between the sender and the receiver. The system and method may be configured to complete the interaction in the decentralized network. If the data exchange request is not completed within a predefined period of time, the system and method may be configured to identify the data exchange request as an incomplete data exchange request. The data exchange request may be considered as incomplete when the data exchange request is stuck in a network layer shared with the system.

In some embodiments, the system and method are integrated into a practical application of improving data exchange reliability by protecting sensitive information associated with users triggering the data exchange requests. In particular, interaction information in frozen data exchange requests is not dropped in the decentralized network by dynamically monitoring and fulfilling interactions triggered via a server. Further, the system and method are integrated into a practical application of improving functionality of the decentralized network by unfreezing interactions and preventing these interactions from causing backlogs in the decentralized network.

In one or more embodiments, the system and method are directed to improvements in computer systems. Specifically, the system and method reduce processor and memory usage in the server and the decentralized network by preventing or eliminating queues in a network. Further, the system and method reduce the possibility of downtime in the decentralized network by prioritizing frozen data exchange requests in new batch orders. In particular, the interactions in the decentralized network are prevented from reaching a hung state and require maintenance because frozen batch orders are fulfilled in a timely manner (e.g., interactions are not frozen indefinitely).

In some embodiments, the system and method described herein are configured to process one or more incoming interactions. In this regard, the system and method may be configured to determine one or more data exchange requests in the incoming interactions. The system and method may determine that the incomplete data exchange request is a repeated request. In accordance with one or more rules and policies, the system and method may be configured to assign a priority value and a weight to the repeated request. In this regard, the system and method may be configured to generate a batch order including a position for the repeated request in accordance with the priority value and the weight. The decentralized network may be configured to receive the batch order, the repeated request, and complete the data exchange request in accordance with a corresponding position in the data exchange request. Upon completion of the data exchange request, the system and method may change the status of the request to indicate that the request was completed.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A-2C illustrate operations of the system of FIG. 1 in accordance with one or more embodiments.

DETAILED DESCRIPTION

Figure 1:
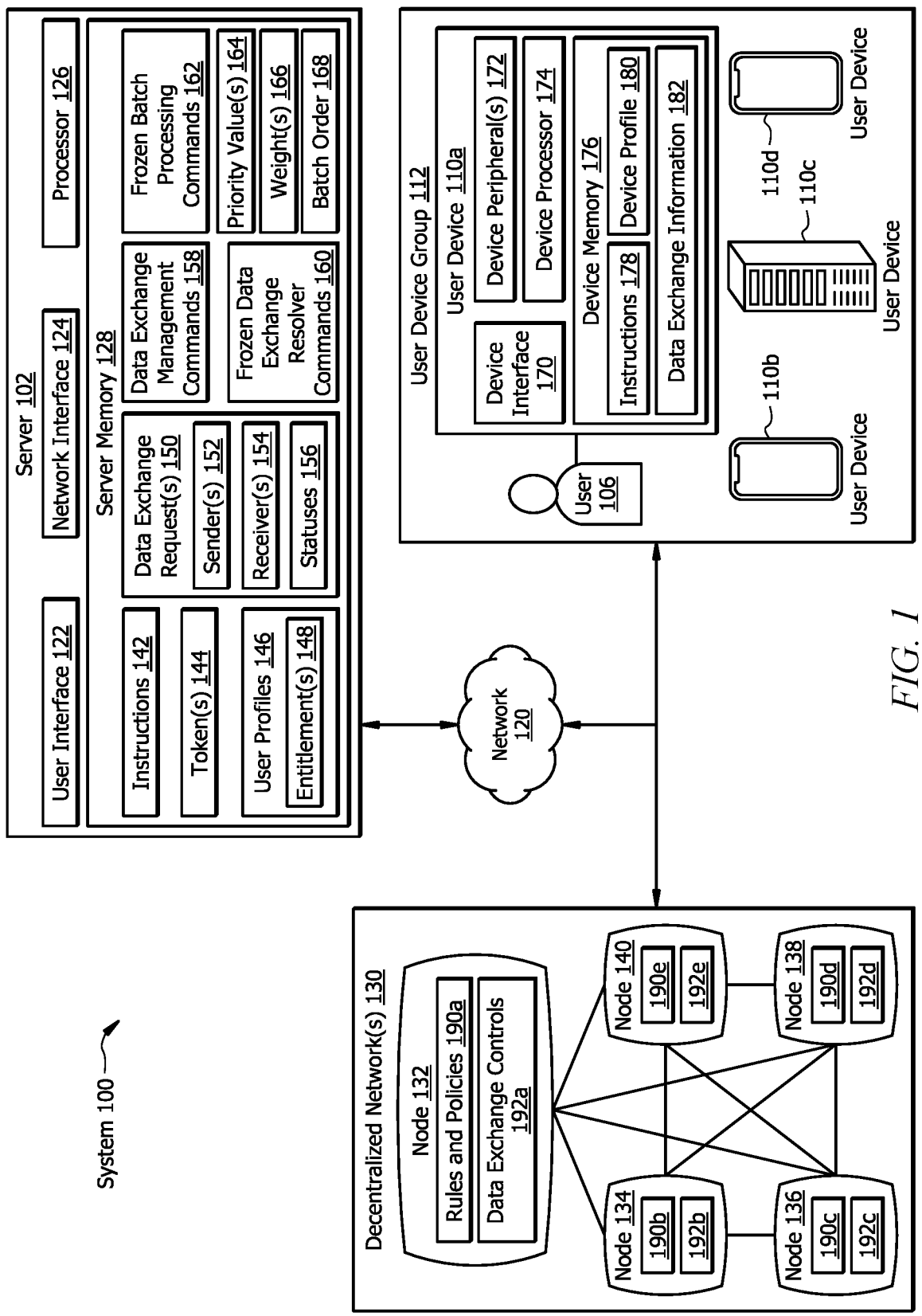
FIG. 1 illustrates a system in accordance with one or more embodiments.
Figure 3:
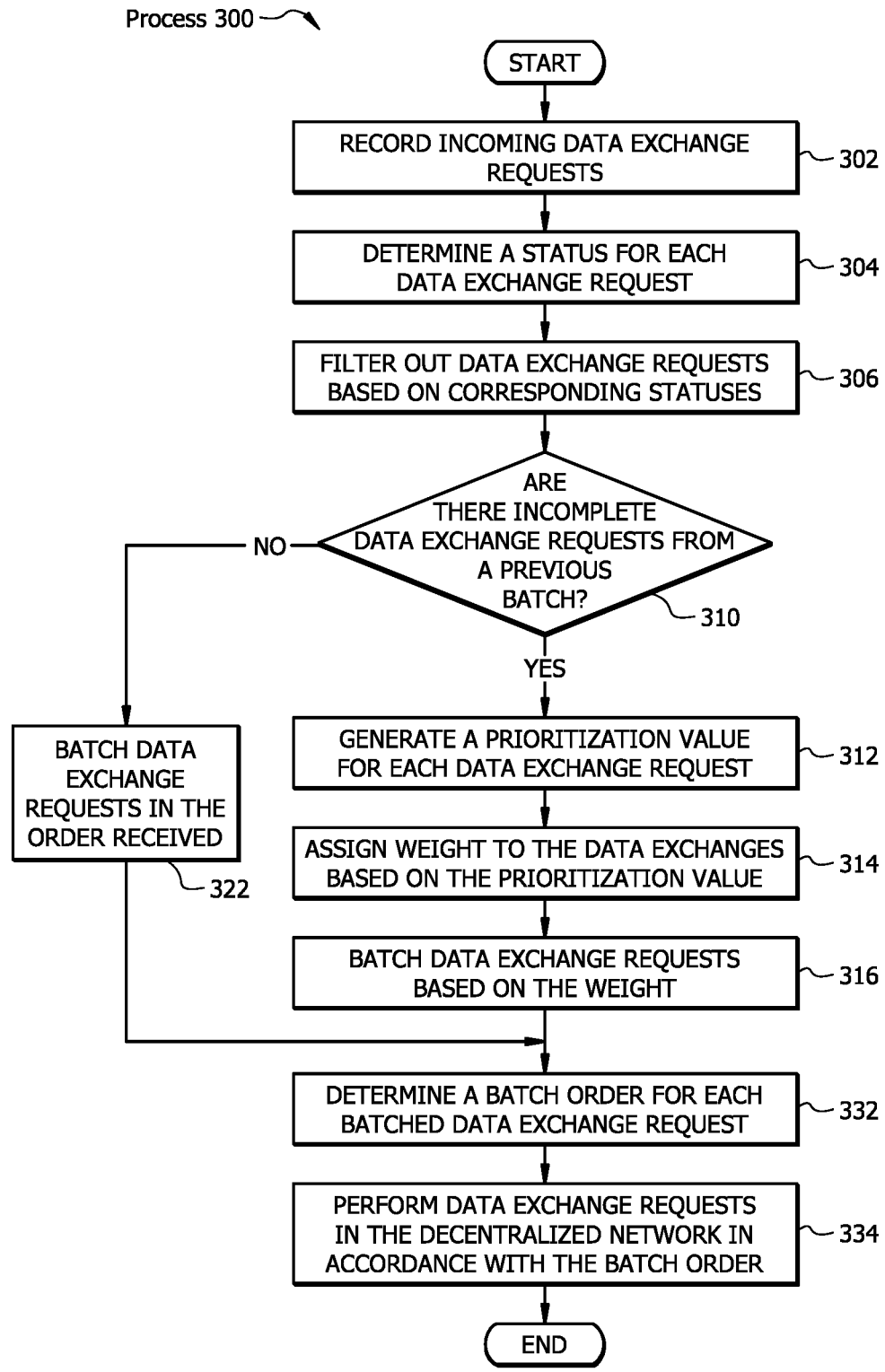
FIG. 3 illustrates an example flowchart of a method to manage data exchange interactions in a decentralized network in accordance with one or more embodiments.

As described above, this disclosure provides various systems and methods to manage data exchanges in a decentralized network. FIG. 1 illustrates a system 100 in which a server 102 is configured to perform decentralized baffled interaction management. FIGS. 2A and 2B illustrates one or more operations performed by the system 100 of FIG. 1. FIG. 3 illustrates a process 300 to perform one or more of the operations of FIGS. 2A and 2B.

System Overview

FIG. 1 illustrates an example system 100, in accordance with one or more embodiments. The system includes an apparatus (e.g., such as the server 102) communicatively coupled to a user device 110*a*, a user device 110*b*, a user device 110*b*, and a user device 110*c* (collectively, user devices 110) in a user device group 112 via a network 120. The server 102 may comprise a user interface 122, a network interface 124, a processor 126, and a server memory 128 communicatively coupled to one another. The server 102 may be configured to communicate with one or more decentralized networks 130 via the network 120. The decentralized networks 130 may comprise a node 132, a node 134, a node 136, a node 136, and a node 140. The decentralized networks 130 may comprise less or more nodes than those shown in FIG. 1. As a non-limiting example, the node 132 comprises one or more rules and policies 190*a* and one or more data exchange controls 192*a*. For example, the node 134 may comprise one or more rules and policies 190*b* and one or more data exchange controls 192*b*, the node 136 may comprise one or more rules and policies 190*c* and one or more data exchange controls 192*c*, the node 138 may comprise one or more rules and policies 190*d* and one or more data exchange controls 192*d*, and the node 140 may comprise one or more rules and policies 190*e* and one or more data exchange controls 192*e*.

In one or more embodiments, the server memory 128 may comprise instructions 142, one or more tokens 144, one or more user profiles 146 comprising one or more corresponding entitlements 148, one or more data exchange requests 150 comprising information associated with one or more senders 152, one or more receivers 154, and corresponding statuses 156, data exchange management commands 158 configured to manage incoming data exchange requests 150, frozen data exchange resolver commands 160 configured to assign one or more priority values to incoming data exchange requests 150, frozen batch processing commands 162 configured to resolve incomplete data exchange requests 150, multiple priority values 164 corresponding to the one or more data exchange requests 150, multiple weights 166 corresponding to the one or more data exchange requests 150, and a batch order 168 providing expected processing order for the data exchange requests 150.

Referring to the user device 110*a* a non-limiting example, the user devices 110 may comprise a device interface 170, one or more device peripherals 172, a device processor 174, and a device memory 176 communicatively coupled to one another. The device memory 176 may comprise instructions 178, a device profile 180, and data exchange information 182.

Security System Components
Server

In one or more embodiments, the server 102 is generally any device that is configured to process data and communicate with computing devices (e.g., user devices 110*a*-110*d*), databases, systems, and the like, via one or more interfaces (i.e., user interface 122 or network interface 124). The server 102 may comprise a processor 126 that is generally configured to oversee operations of a processing engine. The server 102 comprises the processor 126 communicatively coupled with the user interface 122, the network interface 124, and a memory 128. The server 102 may be configured as shown, or in any other configuration.

The processor 126 comprises one or more processors communicatively coupled to the memory 128. The processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 126 may be a programmable logic device, a microcontroller, a microprocessor, or any suitable combination of the preceding. The one or more processors 126 are configured to process data and may be implemented in hardware or software executed by hardware. For example, the processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches instructions 142 from the memory 128 and executes them by directing the coordinated operations of the ALU, registers and other components. In this regard, the one or more processors 126 are configured to execute various instructions. For example, the one or more processors 126 are configured to execute the instructions 142 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the user interface 122 and the network interface 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The user interface 122 and the network interface 124 may be configured to support any suitable type of communication protocol as would be appreciated by one of ordinary skill in the art.

In one or more embodiments, the user interface 122 and the network interface 124 may be configured to enable wired and/or wireless communications. The user interface 122 and the network interface 124 may be configured to communicate data between the server 102 and other user devices (i.e., the user devices 110*a*-110*d*), network devices (i.e., the decentralized networks 130), systems, or domain(s) via the network 120. For example, the network interface 124 may comprise a WIFI interface, a LAN interface, a WAN interface, a modem, a switch, or a router. The processor 126 may be configured to send and receive data using the user interface 122 and the network interface 124. The user interface 122 and the network interface 124 may be configured to use any suitable type of communication protocol. In some embodiments, the communication protocols may be protocols configured in accordance with the non-fungible token (NFT) processing and aggregating of the EIP-3664 standard. In the EIP-3664 standard, tokens may be aggregated or grouped based at least upon common characteristics, such as general changeability, transferability, upgradeability, and evolvable attributes.

In some embodiments, the processor 126 may be any combination of a processing accelerator, signal processing circuitry (e.g., including filters, mixers, oscillators, amplifiers, and the like), or digital processing circuitry (e.g., for digital modulation as well as other digital processing). For example, the processor 126 may be configured to allocate power, processing, and memory resources during updates of firewall configurations and during dynamic aggregation of firewall configurations.

In one or more embodiments, the processor 126 is configured to create, analyze, manage, and update one or more tokens 144. The processor 126 may be configured to communicate with the one or more decentralized networks 130 via the network interface 124 and the network 120. The processor 126 may be configured to perform one or more of the operations described below in reference to FIGS. 2A and 2B. In some embodiments, the processor 126 may be configured to execute one or more of the data exchange management commands 158, the frozen data exchange resolver commands 160, and the frozen batch processing commands 162. In other embodiments, the processor 126 may be configured to aggregate updated tokens of multiple user devices 110 and obtain a new updated token from the decentralized networks 130 comprising updates to the entitlements 148.

The memory 128 may be volatile or non-volatile and may comprise a read-only memory (ROM), random-access memory (RAM), ternary content-addressable memory (TCAM), dynamic random-access memory (DRAM), and static random-access memory (SRAM). The memory 128 may be implemented using one or more disks, tape drives, solid-state drives, and/or the like. The memory 128 is operable to store the instructions 142, the one or more tokens 144, the one or more user profiles 146 comprising the one or more corresponding entitlements 148, the one or more data exchange requests 150 comprising information associated with the one or more senders 152, the one or more receivers 154, and the corresponding statuses 156, the data exchange management commands 158 configured to manage incoming data exchange requests 150, the frozen data exchange resolver commands 160 configured to assign one or more priority values to incoming data exchange requests 150, the frozen batch processing commands 162 configured to resolve incomplete data exchange requests 150, the multiple priority values 164 corresponding to the one or more data exchange requests 150, the multiple weights 166 corresponding to the one or more data exchange requests 150, and the batch order 168 providing expected processing order for the data exchange requests 150, and/or any other data or instructions. The instructions 142 may comprise any suitable set of instructions, logic, rules, or code operable to execute the processor 126.

In one or more embodiments, the user profiles 146 may comprise multiple profiles for users (e.g., user 106). Each user profiles 146 may comprise one or more entitlements 148. As described above, the entitlements 148 may indicate that a given user is allowed to access one or more network resources in accordance with one or more rules and policies 190a-190e (collectively, rules and policies 190). The entitlements 148 may indicate that a given user is allowed to perform one or more operations in the network 120 (e.g., access a specific website on the Internet). To secure or protect operations of the user devices 110 from bad actors, the entitlements may be assigned to a given user profiles 146 in accordance with data exchange controls 192a-192e (collectively, data exchange controls 192), which may provide guidance parameters to the use of the entitlements 148 based at least upon corresponding rules and policies 190.

In one or more embodiments, the data exchange requests 150 comprise the senders 152, the receivers 154, and corresponding statuses 156. The senders 152 and the receivers 154 may be names or identifiers associated with one or more of the user devices 110 in a given user device group 112. The asset names may be a string of numbers, alphanumeric characters, one or more words or phrases, one or more letters, and/or symbols. In some embodiments, the server 102 may comprise one or more entitlements 148 within an organization. For example, an organization may include multiple versions of the server 102 comprising different levels of clearance or access to network resources. In the example of FIG. 1, the server 102 may be entitled to operate the processor 126 and perform one or more of the operations described in reference to FIGS. 2A and 2B in relation to the processor 126.

In one or more embodiments, the statuses 156 comprise one or more indicators showing whether a given data exchange request 150 is fulfilled. In FIG. 1, the statuses 156 may comprise a "fulfilled" status, a "complete" status, or a "completed" status in cases that a given data exchange request 150 is fulfilled by the decentralized networks 130. Further, the statuses 156 may comprise an "unfulfilled" status, an "incomplete" status, or an "uncompleted" status in cases that a given data exchange request 150 is fulfilled by the decentralized networks 130. As part of fulfilling the data exchange requests 150, the server 102 may be configured to execute the data exchange management commands 158, the frozen data exchange resolver commands 160, and the frozen batch processing commands 162.

The data exchange management commands 158 may be configured to initiate an interaction during normal batch processing between two user devices 110. One user device 110 may be configured as a sender 152 and another user device 110 may be configured as a receiver 154. The data exchange management commands 158 are configured to determine whether the statuses 156 indicate that a data exchange request 150 is fulfilled. The data exchange management commands 158 may be configured to instruct the decentralized networks 130 to identify incomplete interactions in the decentralized networks 130. The data exchange management commands 158 may be configured to define a smart contract indicating one or more data objects to be exchanged between the sender 152 and the receiver 154.

The frozen data exchange resolver commands 160 may be configured to generate a priority value 164 for each of the frozen data exchange requests 150. The frozen data exchange resolver commands 160 may assign the priority values 164 of "high," "medium," or "low." Herein, "high" may indicate that a given data exchange request 150 comprises a higher priority, "medium" may indicate that a given data exchange request 150 comprises a lower priority than "high," and "low" may indicate that a given data exchange request 150 comprises a lower priority than "medium." The frozen data exchange resolver commands 160 may be configured to assign the priority values 164 as an alphanumeric representation. As a non-limiting example, a lower number may represent a lower priority and a higher number may represent a higher priority. In another non-limiting example, a lower number may represent a higher priority and a higher number may represent a lower priority.

The frozen batch processing commands 162 may be configured to generate and assign one or more weights 166 to the data exchange commands 158. The frozen batch processing commands 162 may be configured to associate the weights 166 along with the priority values 164 to each frozen data exchange request. The priority values 164 and the weights 166 may be assigned to data exchange requests 150 based at least in part upon the senders 152, the receivers 154, a number of data objects being requested to be exchanges, a period of time that the given data exchange request 150 has remained frozen in the decentralized networks 130, and/or suspicious activity associated with one of the user devices 110 or the user device group 112.

In one or more embodiments, the data exchange management commands 158, the frozen data exchange resolver commands 160, and the frozen batch processing commands 162 may be configured to assign a higher priority value 164 and a higher weight 166 to incoming data exchange requests 150 than to frozen data exchange requests 150 in the decentralized networks 130. The frozen batch processing commands 162 are configured to batch the data exchange requests in accordance with the batch order 168. The batch order 168 may comprise multiple positions over time to fulfill the data exchange requests 150. In some embodiments, the positions are in a queue corresponding to a batch priority.

Network

The network 120 facilitates communication between and amongst the various devices of the system 100. The network 120 may be any suitable network operable to facilitate communication between the server 102, the one or more decentralized networks 130, and the user devices 110 of the system 100. The network 120 may include any interconnecting system capable of transmitting audio, video, signals, data, data packets (e.g., non-fungible tokens (NFT)), messages, or any combination of the preceding. The network 120 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 110 (e.g., the user devices 110a-110d) may be any computing device configured to communicate with other devices, such as the server 102, other user devices 110 in the user device group 112, databases, and the like in the system 100. Each of the user devices 110 may be configured to perform specific functions described herein and interact with one or more user devices 110a-110d in the user device group 112. Examples of user device 110 comprise, but are not limited to, a laptop, a computer, a smartphone, a tablet, a smart device, an IoT device, a simulated reality device, an augmented reality device, or any other suitable type of device.

The user devices 110 may be hardware configured to create, transmit, and/or receive information. The user devices 110 may be configured to receive inputs from a user, process the inputs, and generate data information or command information in response. The data information may include documents or files generated using a graphical user interface (GUI). The command information may include input selections/commands triggered by a user using a peripheral component or one or more device peripherals 172 (i.e., a keyboard) or an integrated input system (i.e., a touchscreen displaying the GUI). The user devices 110 may be communicatively coupled to the server 102 via a network connection (i.e., user interface 122 in the server 102). The user devices 110 may transmit and receive data information, command information, or a combination of both to and from the server 102 via the user interface 122. In one or more embodiments, the user devices 110 is configured to exchange data, commands, and signaling with the server 102. In some embodiments, the user devices 110 are configured to trigger the start of one or more data exchange request 150. The user devices 110 may be configured to receive one or more completions of the data exchange requests 150. In one or more embodiments, while FIG. 1 shows the user device 110a, the user device 110b, the user device 110c, and the user device 110d, the user device group 112 may comprise less or more user devices 110.

In one or more embodiments, referring to the user device 110a as a non-limiting example of the user devices 110, the user device 110a may comprise a device interface 170, one or more device peripherals 172, a device processor 174, and a device memory 176. The device interface 170 may be any suitable hardware or software (e.g., executed by hardware) to facilitate any suitable type of communication in wireless or wired connections. These connections may comprise, but not be limited to, all or a portion of network connections coupled to additional user devices 110a-110d in the user device group 112, the server 102, the Internet, an Intranet, a private network, a public network, a peer-to-peer network, the public switched telephone network, a cellular network, a LAN, a MAN, a WAN, and a satellite network. The device interface 170 may be configured to support any suitable type of communication protocol.

In one or more embodiments, the one or more device peripherals 172 may comprise audio devices (e.g., speaker, microphones, and the like), input devices (e.g., keyboard, mouse, and the like), or any suitable electronic component that may provide a modifying or triggering input to the user device 110a. For example, the one or more device peripherals 172 may be speakers configured to release audio signals (e.g., voice signals or commands) during media playback operations. In another example, the one or more device peripherals 172 may be microphones configured to capture audio signals from the user 106. In one or more embodiments, the one or more device peripherals 172 may be configured to operate continuously, at predetermined time periods or intervals, or on-demand.

The device processor 174 may comprise one or more processors communicatively coupled to and in signal communication with the device interface 170, the device peripherals 172, and the device memory 176. The device processor 174 is any electronic circuitry, including, but not limited to, state machines, one or more CPU chips, logic units, cores (e.g., a multi-core processor), FPGAs, ASICs, or DSPs. The device processor 174 may be a programmable logic device, a microcontroller, a microprocessor, or any suitable combination of the preceding. The one or more processors in the device processor 174 are configured to process data and may be implemented in hardware or software executed by hardware. For example, the device processor 174 may be an 8-bit, a 16-bit, a 32-bit, a 64-bit, or any other suitable architecture. The device processor 174 comprises an ALU to perform arithmetic and logic operations, processor registers that supply operands to the ALU, and store the results of ALU operations, and a control unit that fetches software instructions such as device instructions 178 from the device memory 176 and executes the device instructions 178 by directing the coordinated operations of the ALU, registers, and other components via a device processing engine (not shown). The device processor 174 may be configured to execute various instructions. For example, the device processor 174 may be configured to execute the device instructions 178 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the device profile 180 comprises information associated with a corresponding user device 110. In the example of FIG. 1, the device profile 180 comprises one or more indicators that the user device 110a is one of the senders 152 or the receivers 154 during a specific data exchange request 150. The user device 110a may trigger the specific data exchange request 150 by transmitting the device profile 180 along one or more data exchange information 182. The data exchange information 182 comprises a number of data objects to be exchanged during a data exchange request 150. In some embodiments, the decentralized networks 130 may be configured to execute the data exchange requests 150 based at least in part upon the data exchange management commands 158, the frozen data exchange resolver commands 160, and the frozen batch processing commands 162 provided by the server 102.

Decentralized Network

In one or more embodiments, the decentralized network 130 comprises a peer-to-peer networking protocol that enables development of serverless applications. The decentralized network 130 may include multiple electronic components or devices (i.e., nodes 132-140) comprising specific node data. The nodes 132-140 may not be required to store or validate all data in the decentralized network 130. Instead, validation of each node's data may be obtained via peer accountability.

In some embodiments, the nodes 132-140 may include only their own data and a reference to all other data in the decentralized network 130 in accordance with rules and policies 190 preestablished by an electronic component or device outside the decentralized network 130 (e.g., one or more servers, such as the server 102). These rules and policies 190 may determine how the nodes 132-140 interact with each other and the server 102. The rules and policies 190 may be updated dynamically or periodically with additional data received as updates via one or more planning components (e.g., electronic devices or components configured to provide updates to the rules and policies 190). The updates may be triggered by a perceived lack of knowledge level in the nodes 132-140. A perceived knowledge level in the nodes 132-140 may be identified via node scores (not shown) received from the server 102 as feedback.

In one or more embodiments, each node (i.e., out of nodes 132-140) in the decentralized network 130 includes knowledge-specific information and information associated with peer accountability and a perceived knowledge level. Specifically, referencing the node 132 as a non-limiting example, includes rules and policies 190*a* and updated data exchange controls 192*a*. The updated data exchange controls 192*a* may include information corresponding to at least one knowledge domain configured to perform interactions of one or more user devices 110. In one or more embodiments, the node 132 may be configured to receive one or more of initial tokens. Upon receiving the initial tokens 116, the node 132 may be configured to determine whether any of entitlements 148 of the initial tokens correspond to the knowledge information included in the updated data exchange controls 192*a*.

In other embodiments, the node 132 includes a processor (not shown) configured to provide updates corresponding to specific updated data exchange controls 192. The processor in the node 132 may be configured to provide updated tokens directly to the processor 126. Further, the processor of the node 132 may be configured to route any initial tokens that are not updated to one of the other nodes 134-140 in accordance with one or more rules and policies 194 governing the decentralized network 130. The data exchange controls 192 at a given node 132-140 may be configured to generate a token 144 representative of a data exchange request 150 and perform a corresponding interaction in one or more of the decentralized networks 130. In some embodiments, the data exchange controls 192 may enable tokens 144 to perform interactions between a first decentralized network 130 and a second decentralized network 130. Each of the decentralized networks may comprise corresponding configuration information configured to interpret the data exchange request 150 in the token 144.

In the example of FIG. 1, the decentralized network 130 includes five nodes 132-140. However, additional nodes or fewer nodes may be included. In some embodiments, each of the nodes 132-140 includes a corresponding rules and policies 190 and a corresponding data exchange controls 192. In the decentralized network 130 of FIG. 1, the node 132 includes the rules and policies 190*a* and the updated data exchange controls 192*a*; the node 134 includes the rules and policies 190*b* and the updated data exchange controls 192*b*; the node 136 includes the rules and policies 190*c* and the updated data exchange controls 192*c*; the node 138 includes the rules and policies 190*d* and the updated data exchange controls 192*d*; and the node 140 includes the rules and policies 190*e* and the updated data exchange controls 192*e*.

Operational Flow Overview

FIGS. 2A-2C illustrate examples of one or more operations implemented by the system 100 of FIG. 1, in accordance with one or more embodiments. FIGS. 2A-2C show data exchange management operations 200*a*, frozen data exchange resolver operations 200*b*, and frozen batch processing operations 200*c*, respectively. While the one or more operations are described to be performed by the server 102 and/or the one or more decentralized networks 130, additional electronic devices or components in the server 102 (e.g., the processor 126) or in a network element (not shown) may be configured to perform one or more of the operations. In one or more embodiments, the data exchange management commands 158, the frozen data exchange resolver commands 160, and the frozen batch processing commands 162 are configured to fulfill a data exchange request 150 for an interaction between a sender 152 and a receiver 154. The decentralized networks 130 may be configured to create an entry for the incoming interaction. The data exchange management commands 158 may be configured to determine whether a data exchange request 150 is stuck or frozen. The data exchange request 150 may comprise stuck interactions in a network layer due to network problems, data traffic congestion, or node shutdown. The frozen data exchange resolver commands 160 may be configured to select data exchange requests 150 that are frozen or stuck and try to prioritize an associated interaction based on one or more generated priority values 164. The frozen batch processing commands 162 may be configured to add weights 166 to the data exchange requests 150 and assign corresponding processing space in the decentralized networks 130. In this regard, when a block is created in the decentralized network 130, a percentage of a new block may be assigned to one of the frozen interactions based at least in part upon the priority values 164 and the weights 166. The percentage may be 10 percent, 20 percent, or any suitable percentage. Further, the interactions may be batched in accordance with the batch order 168.

FIG. 2A shows one or more data exchange management operations 200*a* that may be triggered by one or more data exchange management commands 158. In accordance with the data exchange management commands 158 provided by the server 102, the data exchange controls 192 in the decentralized networks 130 may be configured to record incoming interaction information (e.g., data exchange information 182 from the user device 110*a*) and determine a status 156 corresponding to a given interaction. In some embodiments, the data exchange requests 150 are handled via normal batching operations. In other embodiments, the data exchange requests 150 are handled via prioritized batching operations.

In the example of FIG. 2A, the data exchange management operations 200a comprise a first interaction between a sender A and a receiver B, a second interaction between a sender B and a receiver C, and a third interaction between a sender C and a receiver D. The first interaction is shown comprising an identifier showing that the data exchange request 150 was received by the decentralized networks 130 and an indication showing a corresponding status 156. In this case, the corresponding status 156 indicates that the interaction is completed. The second interaction is shown comprising an identifier showing that the data exchange request 150 was received by the decentralized networks 130 and an indication showing a corresponding status 156. In this case, the corresponding status 156 indicates that the interaction is not completed. The third interaction is shown comprising an identifier showing that the data exchange request 150 was not received by the decentralized networks 130 and an indication showing a corresponding status 156. In this case, the corresponding status 156 indicates that the interaction is not completed.

FIG. 2B shows one or more frozen data exchange resolver operations 200b that may be triggered by one or more frozen data exchange resolver commands 160. In accordance with the frozen data exchange resolver commands 160 provided by the server 102, the data exchange controls 192 in the decentralized networks 130 may be configured to pick failed end state interactions and arrange these interactions according to the priority values 164. Further, the frozen data exchange resolver commands 160 may be configured to assign the weights 166 in addition to the one or more of the rules and policies 190.

In the example of FIG. 2B, the frozen data exchange resolver operations 200b comprise a first frozen data exchange between a sender B and a receiver C, a second frozen data exchange between a sender C and a receiver D, and a third frozen data exchange between a sender M and a receiver N. The first interaction is shown comprising a priority value 164 of "high." The first interaction is shown comprising a priority value 164 of "medium." The first interaction is shown comprising a priority value 164 of "low."

FIG. 2C shows one or more frozen batch processing operations 200c that may be triggered by one or more frozen batch processing commands 162. In accordance with the frozen batch processing commands 162 provided by the server 102, the data exchange controls 192 in the decentralized networks 130 may be configured to created blocks comprising allotted space to push frozen interactions in accordance with the weights 166. In some embodiments, the data exchange controls 192 in the decentralized networks 130 may be configured to determine whether a current batch or in a subsequent batch in accordance with the batch order 168.

In the example of FIG. 2C, the frozen batch processing operations 200c comprise a first interaction between a sender B and a receiver C, a second interaction between a sender C and a receiver D, and a third interaction between a sender C and a receiver D. The first interaction is shown comprising a first weight 166 of 15 percent assigned for a current batch and a priority value 164 of "high," the second interaction is shown comprising a second weight 166 of 5% assigned for a current batch and a priority value 164 of "medium," and the third interaction is shown comprising a third weight 166 of 6% assigned for a subsequent batch and a priority value 164 of "medium."

Example Process to Manage Data Exchanges in a Decentralized Network

FIG. 3 illustrates an example flowchart of a process 300 to manage data exchanges in a decentralized network, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the decentralized networks 130, the user device group 112, or components of any of thereof performing operations described in the operations 302-322, any suitable system or components of the system 100 may perform one or more operations of the process 300. For example, one or more operations of the process 300 may be implemented, at least in part, in the form of instructions 142 of FIG. 1, stored on non-transitory, tangible, machine-readable media (e.g., the server memory 128 of FIG. 1) that when run by one or more processors (e.g., the processor 126 of FIG. 1) may cause the one or more processors to perform operations described in operations 302-334.

The process 300 starts at operation 302, where the server 102 records incoming data exchange requests 150. At operation 304, the server 102 determines a status 156 for each data exchange request 150. The server 102 may determine that a data exchange request 150 comprises a sender 152, a receiver 154, and a status 156 indicating whether the data exchange request 150 is not completed between the sender 152 and the receiver 154. At operation 306, the server 102 filters out data exchange requests 150 based on corresponding statuses 156. At operation 310, the server 102 may determine whether there are incomplete data exchange requests 150 from a previous batch.

If the server 102 determines that there are incomplete data exchange requests 150 from the previous batch (e.g., YES), then the process 300 proceeds to operation 312. The data exchange request 150 may be an interaction stuck in a network layer communicatively shared between the server 102 and the decentralized network 130. At operation 312, the server 102 generates a priority value 164 for each data exchange request 150. The server 102 may generate the priority value 164 for the data exchange request 150. The priority value 164 may indicate a batch priority associated with the data exchange request 150. Further priority value 164 may be representative of an urgency associated with completing the data exchange request 150 within a predefined period of time. At operation 314, the server 102 assigns weight 166 to the data exchange requests 150 based on the priority value 164. The weight 166 indicating that the data exchange request 150 is expected to be completed in one or more batch orders 168. As described above, the weight 166 is representative of a period of time that the data exchange request 150 has spent waiting to be completed in a network layer communicatively shared between the server 102 and the decentralized network 130. At operation 316, the server 102 batches data exchange requests 150 based on the weight 166.

If the server 102 determines there are incomplete data exchange requests 150 from the previous batch (e.g., NO), then the process 300 proceeds to operation 322. At operation 322, the server 102 batches the data exchange request 150 in the order received.

The process 300 may end at operation 332 and operation 334. At operation 332, the server 102 determines a batch order 168 for each of the data exchange request 150 batched.

The server 102 may generate the batch order 168 based at least in part upon the weight 166, the batch order 168 comprising a position in a queue corresponding to a batch priority from the priority value 164. At operation 334, the server 102 performs data exchange requests 150 in the decentralized network 130 in accordance with the batch order 168. The decentralized network 130 comprise completing the data exchange request 150 in accordance with the position in the batch order 168. The decentralized network 130 may be configured to generate access to complete the data exchange request 150 in the portion of communication exchanged in a node of the decentralized network 130 based at least in part upon the priority value 164 and the weight 166.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory, configured to store:
   a plurality of data exchange requests to be completed via a decentralized network, each data exchange request comprising information indicating a sender, a receiver, and a completion status; and
a processor communicatively coupled to the memory and configured to:
   determine that a first data exchange request of the plurality of data exchange requests comprises a first status indicating that the first data exchange request is incomplete;
   generate a first priority value for the first data exchange request, the first priority value indicating a first batch priority associated with the first data exchange request;
   assign a first weight for the first data exchange request, the first weight indicating that the first data exchange request is expected to be completed in one or more batch orders;
   generate a first batch order based at least in part upon the first weight, the first batch order comprising a first position of a first plurality of positions in a queue corresponding to the first batch priority; and
   complete the first data exchange request in the decentralized network in accordance with the first position in the first batch order.

2. The apparatus of claim 1, wherein the processor is further configured to:
   determine that a second data exchange request of the plurality of data exchange requests comprises a second status indicating that the second data exchange request is incomplete;
   generate a second priority value for the second data exchange request, the second priority value indicating a second batch priority associated with the second data exchange request;
   assign a second weight for the second data exchange request, the second weight indicating that the second data exchange request is expected to be completed in the one or more batch orders;
   generate a second batch order based at least in part upon the second weight, the second batch order comprising a second position of a second plurality of positions in the queue corresponding to the second batch priority; and
   complete the second data exchange request in the decentralized network in accordance with the second position in the second batch order.

3. The apparatus of claim 1, wherein the processor is further configured to:
   determine that a second data exchange request of the plurality of data exchange requests comprises a second status indicating that the second data exchange request is incomplete;
   determine that a third data exchange request of the plurality of data exchange requests comprises a third status indicating that the third data exchange request is incomplete;
   generate a second priority value for the second data exchange request, the second priority value indicating a second batch priority associated with the second data exchange request;
   generate a third priority value for the third data exchange request, the third priority value indicating a third batch priority associated with the third data exchange request;
   assign a second weight for the second data exchange request, the second weight indicating that the second data exchange request is expected to be completed in a second batch order;
   assign a third weight for the third data exchange request, the third weight indicating that the third data exchange request is expected to be completed in the second batch order;
   generate the second batch order based at least in part upon the second weight, wherein the second batch order comprising:
      a second position of a second plurality of positions in the queue corresponding to the second batch priority; and
      a third position of the second plurality of positions in the queue corresponding to the third batch priority; and
   complete the second data exchange request in the decentralized network in accordance with the second position in the second batch order and the third data exchange request in the decentralized network in accordance with the third position in the second batch order.

4. The apparatus of claim 1, wherein the first priority value is representative of an urgency associated with completing the first data exchange request within a predefined period of time.

5. The apparatus of claim 1, wherein the first weight is representative of a period of time that the first data exchange request has spent waiting to be completed in a network layer communicatively shared between the apparatus and the decentralized network.

6. The apparatus of claim 1, wherein the decentralized network is configured to generate access to complete the first data exchange request in a portion of communication exchanged in a node of the decentralized network based at least in part upon the first priority value and the first weight.

7. The apparatus of claim 1, wherein the first data exchange request is an interaction stuck in a network layer communicatively shared between the apparatus and the decentralized network.

8. The apparatus of claim 1, wherein the processor is further configured to, in conjunction with completing the first data exchange request in the decentralized network, update the first status to indicate that the first data exchange request is complete.

9. A system, comprising:
a decentralized network comprising:
a first node comprising a processor configured to:
fulfill one or more data exchange requests, each data exchange request comprising information indicating a sender, a receiver, and a completion status; and
a server communicatively coupled to the decentralized network and configured to:
determine that a first data exchange request of a plurality of data exchange requests comprises a first status indicating that the first data exchange request is incomplete;
generate a first priority value for the first data exchange request, the first priority value indicating a first batch priority associated with the first data exchange request;
assign a first weight for the first data exchange request, the first weight indicating that the first data exchange request is expected to be completed in one or more batch orders;
generate a first batch order based at least in part upon the first weight, the first batch order comprising a first position of a first plurality of positions in a queue corresponding to the first batch priority; and
complete the first data exchange request in the decentralized network in accordance with the first position in the first batch order.

10. The system of claim 9, wherein the server is further configured to:
determine that a second data exchange request of the plurality of data exchange requests comprises a second status indicating that the second data exchange request is incomplete;
generate a second priority value for the second data exchange request, the second priority value indicating a second batch priority associated with the second data exchange request;
assign a second weight for the second data exchange request, the second weight indicating that the second data exchange request is expected to be completed in the one or more batch orders;
generate a second batch order based at least in part upon the second weight, the second batch order comprising a second position of a second plurality of positions in the queue corresponding to the second batch priority; and
complete the second data exchange request in the decentralized network in accordance with the second position in the second batch order.

11. The system of claim 9, wherein the server is further configured to:
determine that a second data exchange request of the plurality of data exchange requests comprises a second status indicating that the second data exchange request is incomplete;
determine that a third data exchange request of the plurality of data exchange requests comprises a third status indicating that the third data exchange request is incomplete;
generate a second priority value for the second data exchange request, the second priority value indicating a second batch priority associated with the second data exchange request;
generate a third priority value for the third data exchange request, the third priority value indicating a third batch priority associated with the third data exchange request;
assign a second weight for the second data exchange request, the second weight indicating that the second data exchange request is expected to be completed in a second batch order;
assign a third weight for the third data exchange request, the third weight indicating that the third data exchange request is expected to be completed in the second batch order;
generate the second batch order based at least in part upon the second weight, wherein the second batch order comprising:
a second position of a second plurality of positions in the queue corresponding to the second batch priority; and
a third position of the second plurality of positions in the queue corresponding to the third batch priority; and
complete the second data exchange request in the decentralized network in accordance with the second position in the second batch order and the third data exchange request in the decentralized network in accordance with the third position in the second batch order.

12. The system of claim 9, wherein the first priority value is representative of an urgency associated with completing the first data exchange request within a predefined period of time.

13. The system of claim 9, wherein the first weight is representative of a period of time that the first data exchange request has spent waiting to be completed in a network layer communicatively shared between the server and the decentralized network.

14. The system of claim 9, wherein the decentralized network is configured to generate access to complete the first data exchange request in a portion of communication exchanged in a node of the decentralized network based at least in part upon the first priority value and the first weight.

15. The system of claim 9, wherein the first data exchange request is an interaction stuck in a network layer communicatively shared between the server and the decentralized network.

16. The system of claim 9, wherein the server is further configured to, in conjunction with completing the first data exchange request in the decentralized network, update the first status to indicate that the first data exchange request is complete.

17. A method, comprising:
   determining that a first data exchange request of a plurality of data exchange requests comprises a first status indicating that the first data exchange request is incomplete, each data exchange request of the plurality of data exchange requests comprises information indicating a sender, a receiver, and a completion status;
   generating a first priority value for the first data exchange request, the first priority value indicating a first batch priority associated with the first data exchange request;
   assigning a first weight for the first data exchange request, the first weight indicating that the first data exchange request is expected to be completed in one or more batch orders;
   generating a first batch order based at least in part upon the first weight, the first batch order comprising a first position of a first plurality of positions in a queue corresponding to the first batch priority; and
   completing the first data exchange request in a decentralized network in accordance with the first position in the first batch order.

18. The method of claim 17, further comprising:
   determining that a second data exchange request of the plurality of data exchange requests comprises a second status indicating that the second data exchange request is incomplete;
   generating a second priority value for the second data exchange request, the second priority value indicating a second batch priority associated with the second data exchange request;
   assigning a second weight for the second data exchange request, the second weight indicating that the second data exchange request is expected to be completed in the one or more batch orders;
   generating a second batch order based at least in part upon the second weight, the second batch order comprising a second position of a second plurality of positions in the queue corresponding to the second batch priority; and
   completing the second data exchange request in the decentralized network in accordance with the second position in the second batch order.

19. The method of claim 17, further comprising:
   determining that a second data exchange request of the plurality of data exchange requests comprises a second status indicating that the second data exchange request is incomplete;
   determining that a third data exchange request of the plurality of data exchange requests comprises a third status indicating that the third data exchange request is incomplete;
   generating a second priority value for the second data exchange request, the second priority value indicating a second batch priority associated with the second data exchange request;
   generating a third priority value for the third data exchange request, the third priority value indicating a third batch priority associated with the third data exchange request;
   assigning a second weight for the second data exchange request, the second weight indicating that the second data exchange request is expected to be completed in a second batch order;
   assigning a third weight for the third data exchange request, the third weight indicating that the third data exchange request is expected to be completed in the second batch order;
   generating the second batch order based at least in part upon the second weight, wherein the second batch order comprising:
      a second position of a second plurality of positions in the queue corresponding to the second batch priority; and
      a third position of the second plurality of positions in the queue corresponding to the third batch priority; and
   completing the second data exchange request in the decentralized network in accordance with the second position in the second batch order and the third data exchange request in the decentralized network in accordance with the third position in the second batch order.

20. The method of claim 17, wherein the first priority value is representative of an urgency associated with completing the first data exchange request within a predefined period of time.

\* \* \* \* \*